(12) United States Patent
Sundholm (10) Patent No.: US 11,948,040 B2
(45) Date of Patent: Apr. 2, 2024

(54) ELECTRONIC PRICE LABEL AND ELECTRONIC PRICE LABEL SYSTEM

(71) Applicant: MariElla Labels Oy, Vantaa (FI)

(72) Inventor: Göran Sundholm, Tuusula (FI)

(73) Assignee: MARIELLA LABELS OY, Vantaa (FI)

( * ) Notice: Subject to any disclaimer, the term of this patent is extended or adjusted under 35 U.S.C. 154(b) by 47 days.

(21) Appl. No.: 17/619,670

(22) PCT Filed: Jun. 16, 2020

(86) PCT No.: PCT/FI2020/050428
§ 371 (c)(1),
(2) Date: Dec. 16, 2021

(87) PCT Pub. No.: WO2020/254725
PCT Pub. Date: Dec. 24, 2020

(65) Prior Publication Data
US 2022/0309261 A1  Sep. 29, 2022

(30) Foreign Application Priority Data
Jun. 19, 2019 (FI) .................................. 20195539

(51) Int. Cl.
*G06K 7/10*   (2006.01)
*G06K 19/077*  (2006.01)
*G09F 3/20*   (2006.01)

(52) U.S. Cl.
CPC ... *G06K 7/10297* (2013.01); *G06K 19/07707* (2013.01); *G09F 3/208* (2013.01)

(58) Field of Classification Search
CPC .......... G06K 7/10297; G06K 19/07707; G09F 3/208
(Continued)

(56) References Cited

U.S. PATENT DOCUMENTS

| 5,151,684 A |   | 9/1992 | Johnsen |
| 6,269,342 B1 | * | 7/2001 | Brick ...................... G06F 3/147 |
|  |  |  | 235/383 |

(Continued)

FOREIGN PATENT DOCUMENTS

| FI |   | 20050192 A |   | 8/2006 |
| WO | WO 99/62269 A2 | 12/1999 |

(Continued)

OTHER PUBLICATIONS

International Search Report, issued in PCT/FI2020/050428, dated Sep. 28, 2020.

(Continued)

*Primary Examiner* — Ahshik Kim
(74) *Attorney, Agent, or Firm* — Birch, Stewart, Kolasch & Birch, LLP (57) ABSTRACT

An electronic price label system and an electronic price label, which include a communication device for receiving information related to a product. The electronic price label further includes a first display for displaying information related to the product, and a second display for displaying information related to the product. The first display and the second display are separate displays, and the first display and second display are adapted to be controlled separate from each other.

20 Claims, 4 Drawing Sheets

(58) Field of Classification Search
USPC .......................................................... 235/451
See application file for complete search history.

(56)  References Cited

U.S. PATENT DOCUMENTS

| | | | | |
|---|---|---|---|---|
| 6,715,676 | B1* | 4/2004 | Janning | ................. G06Q 30/06 |
| | | | | 235/383 |
| 7,152,040 | B1* | 12/2006 | Hawthorne | .......... G06Q 10/087 |
| | | | | 705/14.1 |
| 2001/0020935 | A1 | 9/2001 | Gelbman | |
| 2006/0279527 | A1* | 12/2006 | Zehner | .................... G09G 3/38 |
| | | | | 345/107 |
| 2007/0181678 | A1* | 8/2007 | Nilsson | ................. G06Q 30/00 |
| | | | | 235/383 |
| 2009/0179825 | A1 | 7/2009 | Enarvi et al. | |
| 2014/0279126 | A1* | 9/2014 | Schweiger | ......... G06Q 30/0641 |
| | | | | 705/26.1 |
| 2015/0170550 | A1 | 6/2015 | Jubro et al. | |
| 2016/0071476 | A1 | 3/2016 | Jeon et al. | |
| 2017/0006573 | A1 | 1/2017 | Kelly | |
| 2020/0160681 | A1* | 5/2020 | Kwon | .................... G09F 3/208 |
| 2021/0280092 | A1* | 9/2021 | Sundholm | ............... G09F 3/208 |
| 2022/0036768 | A1* | 2/2022 | Cho | .......................... G09F 9/30 |

FOREIGN PATENT DOCUMENTS

| | | |
|---|---|---|
| WO | WO 2009/103857 A1 | 8/2009 |
| WO | WO 2019/092306 A1 | 5/2019 |

OTHER PUBLICATIONS

Written Opinion of the International Searching Authority, issued in PCT/FI2020/050428, dated Sep. 28, 2020.

* cited by examiner

ELECTRONIC PRICE LABEL AND ELECTRONIC PRICE LABEL SYSTEM

FIELD OF THE INVENTION

The invention relates to an electronic price label and an electronic price label system.

BACKGROUND OF THE INVENTION

Traditionally, price information on price labels is changed manually when the price of a product changes. The new price labels are printed on paper or a corresponding material and these labels with the new price markings are placed manually on the products or in reserved spots on the shelves in sales areas. Thus, the employee must first find the correct spot for the price label to be updated and thereafter the previous price label is removed and discarded, and the new price label is set into place.

A disadvantage of this arrangement is, among others, that the arrangement involves a lot of work and the risk of errors is great. In case of an error a situation can for example arise, where the price information of the price label on the products or shelves is at variance with the price information in the cash register system.

In order to avoid disadvantages as described above, electronic systems have been developed, wherein electronic labels are attached to products or near products, where price information of the products can be altered centrally from a system control centre or the like. This enables and speeds up updating of price information in a remarkable manner. Information on displays can be updated in a wired or wireless manner, depending on the system.

A system is known from publication WO 2009/103857A1, where wireless electronic price labels are used. The properties of the wireless layered electronic price labels presented in the publication are excellent. In a shop environment, there can however be a need for updating different pieces of information on the electronic price labels, for example information, which does not change often, such as size information of the product, or information, which needs to be updated often, such as for example price information. Current electronic price labels do not function optimally in such situations, and they do not take into account individual requirements of different situations.

SUMMARY OF THE INVENTION

It is an object of the invention to enable an inexpensive, reliable and compactly sized electronic price label, which can present to a user different pieces of information related to a product and which simultaneously has a low cost and is adapted to function optimally with different types of information related to the product, for example with regards to power consumption.

The electronic price label according to the invention is characterized in what is mentioned in claim 1. Some embodiments of the electronic price label according to the invention are characterized in what is mentioned in claims 2-13. The electronic price label system according to the invention is characterized in what is mentioned in claim 14. Some embodiments of the electronic price label system according to the invention are characterized in what is mentioned in claims 15-19.

In the solution of the invention, the electronic price label comprises communication means for receiving information relating to the product and further a first display for displaying information relating to the product, and a second display for displaying information relating to the product. The first display and the second display are separate displays, and/or the first display and second display are adapted to be controlled separate from each other.

In one embodiment of the invention, the electronic price label is adapted to receive information relating to the first display by means of a different system and/or technology than information relating to the second display.

In one embodiment of the invention, the second display, a display unit comprising the second display and/or the electronic price label comprises means, with the aid of which the second display is adapted to be updated by means of a near field. In one embodiment of the invention, an RFID chip is arranged in connection with the second display, by means of which RFID chip the second display is adapted to be updated by means of an RFID near field.

In one embodiment of the invention, the electronic price label comprises means, with the aid of which the first display is adapted to be updated via a base station of a radio frequency price label system and/or an electronic price label system.

In one embodiment of the invention, the first display and the second display are adapted to show mutually different information related to the product, the first display e.g. price information and the second display e.g. product size information.

In one embodiment of the invention, the first display is connected to a voltage source of the electronic price label, e.g. a battery, whereby the first display is adapted to receive the energy it needs from the voltage source of the electronic price label. In one embodiment of the invention, the second display comprises means for receiving energy in a wireless manner, whereby the second display is adapted to receive the energy it needs in a wireless manner, e.g. by means of a near field. In one embodiment of the invention, the second display is not connected to the voltage source of the electronic price label.

The solution according to the invention has many remarkable advantages, when it is compared to solutions according to prior art. By means of the solution according to the invention, the function of an electronic price label can be optimized, for example with regards to power consumption. This is necessary because the electronic price label shows different pieces of information, such as frequently updated information, e.g. price information, sale information, and more permanent information, e.g. information related to the size of the product, information related to the model of the product and/or information, which remains the same during the sale time of the product. In the solution of the invention, different types of and/or mutually separate displays can be optimized according to what type of information it is desired for them to show. The structure of the first display and its integration with the rest of the electronic price label can be optimized according to the information to be shown on the first display needing to be updated often. The structure of the second display and its integration with the rest of the electronic price label can be optimized according to the information shown on the second display remaining the same for a long time, e.g. the same for the entire time that the product is in the store. Such a solution can achieve for example an electronic price label consuming less electricity, which can also be made to be lower in cost than known solutions.

DESCRIPTION OF FIGURES

In the following, the invention will be described in more detail with the aid of the exemplary embodiments with reference to the enclosed figures, in which.

DETAILED DESCRIPTION OF THE INVENTION

In the solution according to the invention, the electronic price label comprises a first and a second display, which can be mutually separate displays. In one embodiment of the invention the displays can be controlled separate from each other and they can be updated via different systems.

The first and/or second display of the electronic price label to be used in one embodiment of the invention, which can be e.g. a laminate display, is arranged to display the product's price and/or product information. Other information related to the product can also be shown on the front surface of the electronic price label, such as for example the brand of the product. In one embodiment of the invention, the frame part, the front surface and/or the rear surface and/or the fastening tab of the electronic price label is substantially flexible. In one embodiment of the invention, the frame part, the front surface and/or rear surface and/or protective body of the price label is substantially hard and inflexible.

The electronics of the electronic price label can be placed inside the frame part on in connection to it. The display or displays of the electronic price label can be equipped with display segments or pixels. The electronic price label can resemble a paper price label, where the required product prices and other necessary symbols are formed by changing the colours of segments or pixels in the display. The first and/or second display can be two-coloured or multi-coloured.

In one embodiment of the invention, one layer of the display is for example an active ink layer. The ink layer contains several micro capsules, which are filled with a liquid and which contain for example substantially black particles, which have a positive surface charge and the location of which is controlled with an electric field, so that the black particles are on top in desired display segments, where said display segment looks black when seen from above, and in other display segments the white particles are on top, where these display segments look white when seen from above. The background of the display is formed of the same micro capsules, where for example information related to the product can be displayed as dark numbers against a light background or vice versa if so desired. Such a display, which can be used as the first or second display, can for example be an electrophoretic micro capsule display laminate described in Finnish patent application FI 20050192. In one embodiment of the invention, the surface of the electronic price label is substantially even. In one embodiment of the invention, a display based on electronic ink, an e-ink display and/or an LCD display can be used as the displays. The first display and the second display can to their type be mutually the same or different displays.

The electronic price label according to the invention comprises communication means, by means of which it can communicate with a radio frequency electronic price label system and its base station. By means of the communication means, electronic price labels can listen to transmissions sent by the electronic price label system and identify the command related to it based on a certain price label-specific identifier. After receiving a command belonging to it, an individual electronic price label can respond to the base station by reflecting the base station's own transmission back to the base station as altered with a phase shift caused by a certain time delay and at a certain time. Typically, after having sent a command intended for a certain price label, the base station of the electronic price label system starts to send for a certain time for example a certain type of carrier wave, which the price label that recognized the command reflects back with a certain phase shift. The base station of the electronic price label system can thus in this embodiment recognize that the reflex response belongs to a certain price label, because it knows to expect it at a certain time period after the individual command it sent to the price label. From its own transmission, the base station can differentiate the reflex response with a significantly weaker effect, e.g. based on the phase shift produced therein by the display device.

The electronic price label used in the solution according to the invention can comprise communication means, which have mode switching means for switching the mode of the antenna of the receiver between at least two different modes, where for example in the first mode the reflection property of the antenna is good and in the second mode the reflection property is poor. Correspondingly, the modes of the antenna can be adapted with the mode switching means, so that the antenna reflects radio waves in different phases in different modes. Thus, the electronic price label can be adapted to vary the mode of the antenna of its receiver to produce a reflection coded in a certain way, which has a different time delay according to the mode of the antenna. The base stations of the electronic price label system can interpret different time delays as coded data signals sent by the electronic price labels, based on which the base stations can for example recognize each display unit. The above-mention coding can at its simplest be that the electronic price label can reflect back the carrier wave transmitted by the base station, which can have a frequency of for example 685 MHz, so that the electronic price label with the aid of the mode switching means grounds the antenna of the receiver for example at a 150 kHz frequency, thus forming a sort of transverse wave of the reflected signal. The electronic price label can thus affect the reflected signal by changing the mode of the antenna.

In this reflection, the phase shift experienced by the signal can be for example 180 degrees. The above-mentioned communication manner is presented only as one example, and the communication between the electronic price label and the base station of the electronic price label system according to the invention can be arranged also in some other known manner. In the solution of the invention, the communication of the electronic price labels with the electronic price label system can function by means of a remote field or near field.

In the solution of the invention, the electronic price label can comprise a fastening tab, by means of which the electronic price label can be attached to the product. The fastening tab can be arranged to function as an antenna. The fastening tab, with which the electronic price label can be attached to a product, can in one embodiment be a fastening tab which is separate from the electronic price label. Thus, the fastening tab can be detachable from the electronic price label without tools. In another embodiment of the invention, the fastening tab is arranged on the electronic price label or connected to it in a fixed manner. If the fastening tab functions as an antenna, it can comprise such material, for example metal, by means of which at least one antenna radiation part is formed in the fastening tab, which radiation part is arranged so that it connects electronically to the electronic price label and its communication means. In the solution of the invention, the fastening tab can be adapted to function e.g. as an electronic price label system antenna and/or RFID antenna.

The fastening tab can be connected electronically to the electronic price label e.g. via contact points inside the frame part of the price label. In one embodiment of the invention, a ring-like tab can be used, through which the fastening tab can be threaded. Thus, a loop can be formed in the fastening tab, by means of which the electronic price label can be attached to the product. In one embodiment of the invention, the loop formed with the fastening tab can be tightened. In one embodiment of the invention, the tab is attached in place in a fixed manner. The electronic price label can comprise a battery.

In one embodiment of the invention, the fastening tab can be formed from one ribbon-like and electrically conductive part, which is attached electronically to the electronic price label to one contact point inside the frame part of the electronic price label. A loop can be formed at the end of the fastening tab with the aid of a binding part.

In the solution of the invention, the fastening tab to be used can be a ribbon-like part comprising metal with a substantially circular cross-section, which is covered with a plastic layer. If the fastening tab functions as an antenna, the fastening tab has, at least in some part of the fastening tab, a contact area, through which an electrical connection can be formed between the communication means of the electronic price label and the fastening tab functioning as an antenna.

In one embodiment of the invention, the fastening tab can comprise at least one loop-like or ring-like part, through which for example a fastening part can be pushed, such as a pin or spike, for fastening the price label to the product. A separate locking part can be attached to the pin, whereby the electronic price label can be attached to the product. In one embodiment of the invention, the separate locking part can also function as an anti-theft alarm tag.

In one embodiment of the invention, the fastening part to be arranged in connection with the electronic price label, such as the pin or spike, with which the price label can be attached to the product, can be arranged to be turning. The turning fastening part can be turned substantially in the direction of the electronic price label or fastening tab, whereby it makes it easier to e.g. store the electronic price label when the price label is not in use. The turning fastening part can in connection with attaching to the product be turned substantially perpendicular to the protective casing of the fastening part of the electronic price label, whereby it can be attached through the product into a separate locking part.

Figure 1A:
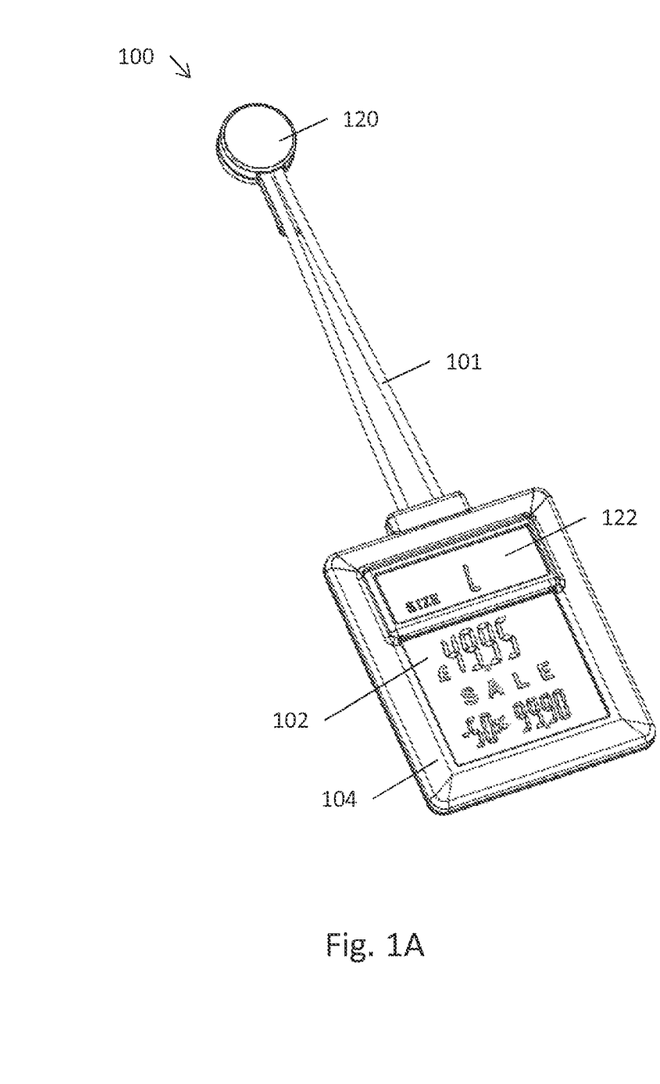
FIG. 1A shows an electronic price label according to one embodiment of the invention and seen diagonally from the front.
Figure 1B:
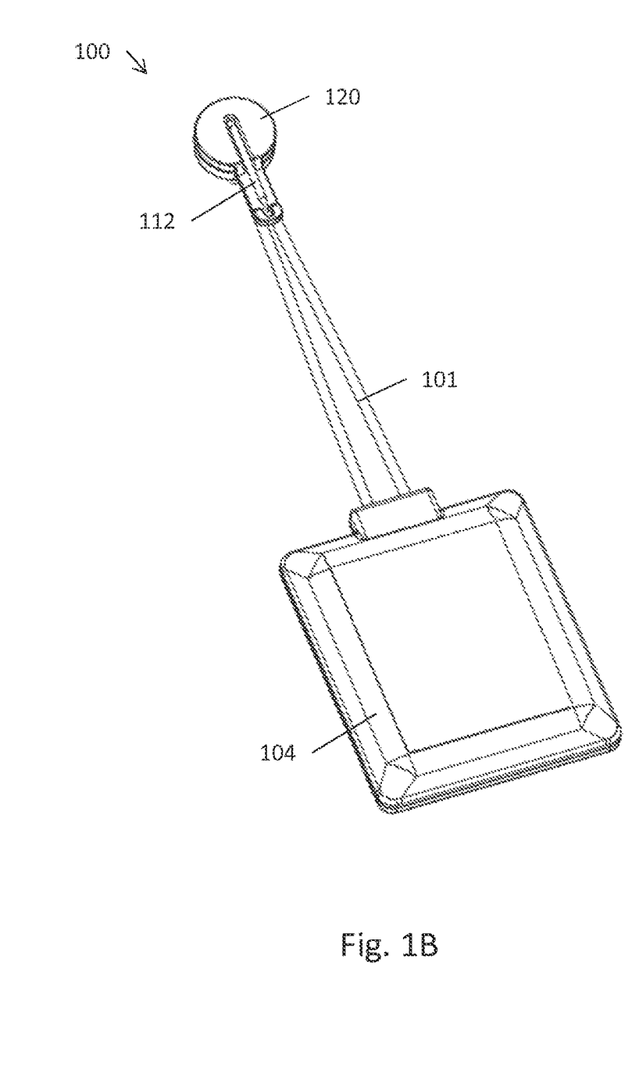
FIG. 1B shows an electronic price label according to one embodiment of the invention and seen diagonally from behind.

FIGS. 1A-1B show an example of one embodiment of the invention. FIG. 1A shows an electronic price label according to one embodiment of the invention and seen diagonally from the front and FIG. 1B shows an electronic price label according to one embodiment of the invention and seen diagonally from behind. The price label according to the FIGS. 1A-1B in question comprises a frame part 104 and a thereto attached fastening tab 101. Means for attaching a fastening part 112, such as a spike, have been arranged in connection with a loop formed in the fastening tab 101. The fastening part 112 can be attached e.g. to the casing 120 of the fastening part, which casing is arranged in connection with the fastening tab 101. The fastening part 112 can be arranged to be bending. In one embodiment of the invention, the casing 120 can have a recess for the turned fastening part 112. The fastening part, such as a pin, can be pushed through a ring-like part and thereafter into a separate locking part, whereby the electronic price label can be attached to the product.

The electronic price label shown in FIGS. 1A-1B also comprises a first display 102 and a second display 122. The first display 102 and second display 122 are in this embodiment arranged on the same side of the electronic price label. In the embodiment on question the second display 122 is arranged above the first display 102. In the case of the embodiment in question, the second display 122 is arranged substantially inside the frame part 104 of the electronic price label and the frame part 104 has an opening for both displays. The second display can be arranged in any place on the front of the electronic price label.

Figure 2A:
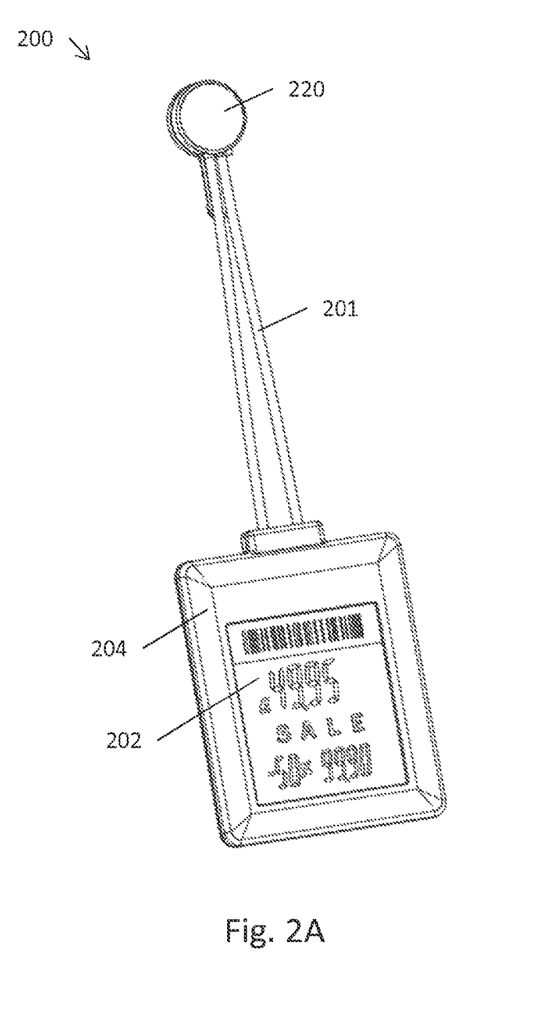
FIG. 2A shows an electronic price label according to one embodiment of the invention and seen diagonally from the front.
Figure 2B:
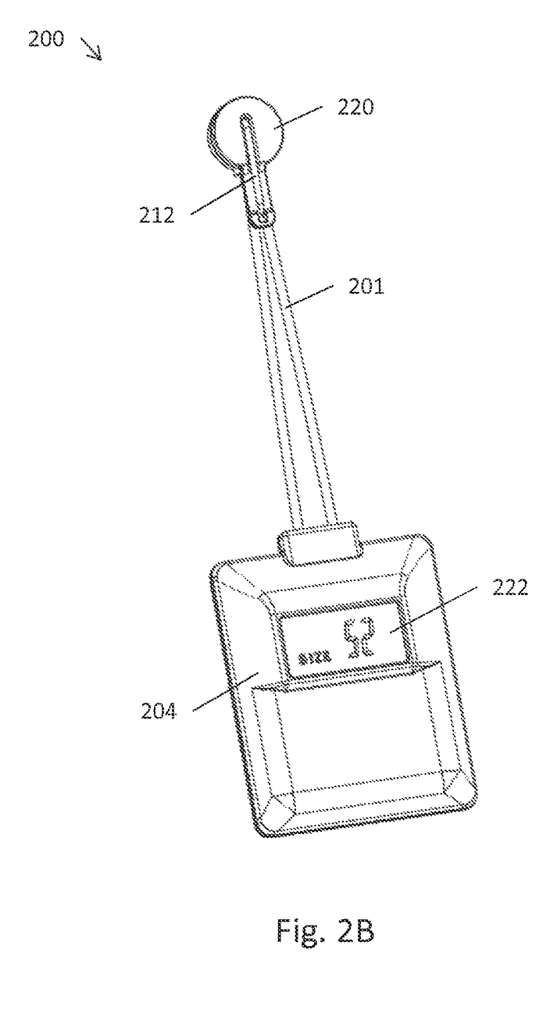
FIG. 2B shows an electronic price label according to one embodiment of the invention and seen diagonally from behind.

FIG. 2A—2B show an electronic price label according to one embodiment of the invention and seen diagonally from the front and diagonally from behind. The embodiment shown in FIGS. 2A-2B otherwise corresponds to the embodiment shown in FIGS. 1A-1B, but in this solution the second display 222 is arranged on the rear side of the price label 200 and the first display 202 is arranged on the front side of the price label 200. In the case of the embodiment in question, the second display 222 is arranged substantially inside the frame part 204 of the electronic price label and the frame part has an opening for the first display in the front part of the frame part of the electronic price label and an opening for the second display in the rear part of the frame part of the electronic price label. The second display can be arranged in any location on the rear of the electronic price label 200.

As with the embodiment shown in FIGS. 1A-1B, the price label of FIGS. 2A—2B comprises a fastening tab 201 attached to the frame part and a casing 220 of the fastening part, which is arranged in connection with the fastening tab 201. The fastening part 212 can be arranged to be bending as in the case of the embodiment described above. In one embodiment of the invention, the casing 220 can have a recess for the turned fastening part 212.

Figure 3A:
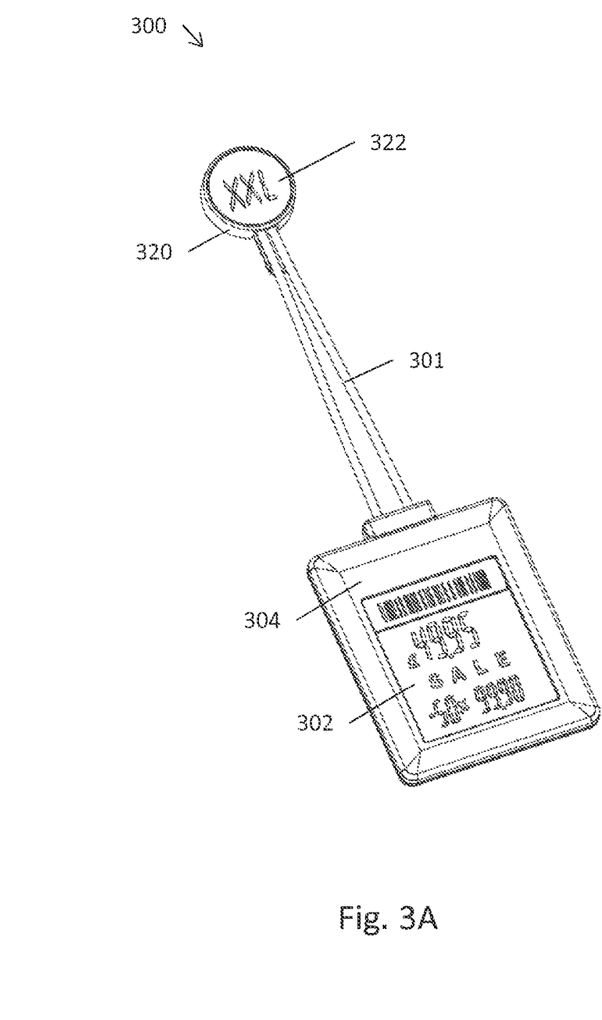
FIG. 3A shows an electronic price label according to one embodiment of the invention and seen diagonally from the front.
Figure 3B:
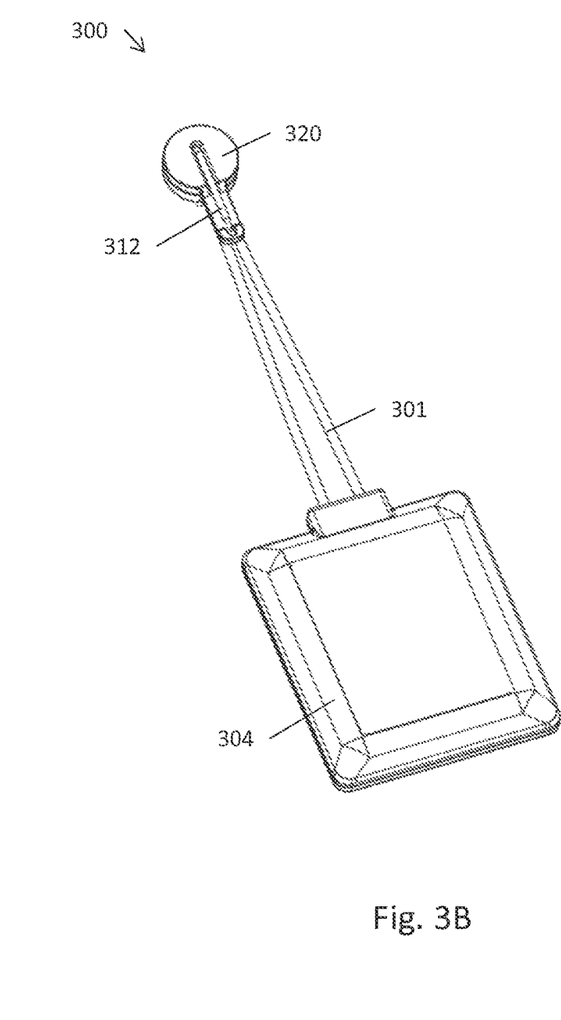
FIG. 3B shows an electronic price label according to one embodiment of the invention and seen diagonally from behind.

FIG. 3A—3B show an electronic price label according to one embodiment of the invention and seen diagonally from the front and diagonally from behind. The embodiment shown in FIGS. 3A-3B otherwise corresponds to the embodiment shown in FIGS. 1A-1B, but in this solution the second display 322 is arranged in connection with the casing 320 of the fastening part of the price label, so that it is inside the casing and visible to the front side of the electronic price label. The first display 302 is arranged on the front side of the price label 300. The second display can be arranged in any location in the casing of the fastening part of the electronic price label, for example on the surface of the casing of the fastening part.

As with the embodiment shown in FIGS. 1A-1B, the price label according to the FIGS. 3A-3B comprises a frame part 304 and a fastening tab 301 attached to the frame part. The fastening part 312 can be arranged to be bending as in the case of the embodiments described above. In one embodiment of the invention, the casing 320 can have a recess for the turned fastening part 312.

Figure 4A:
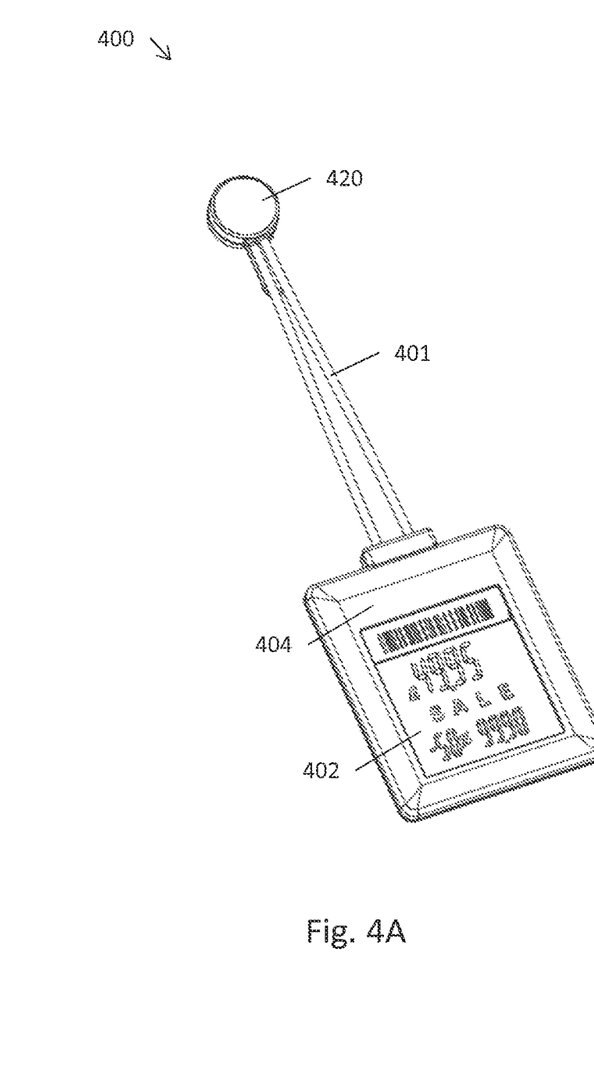
FIG. 4A shows an electronic price label according to one embodiment of the invention and seen diagonally from the front.
Figure 4B:
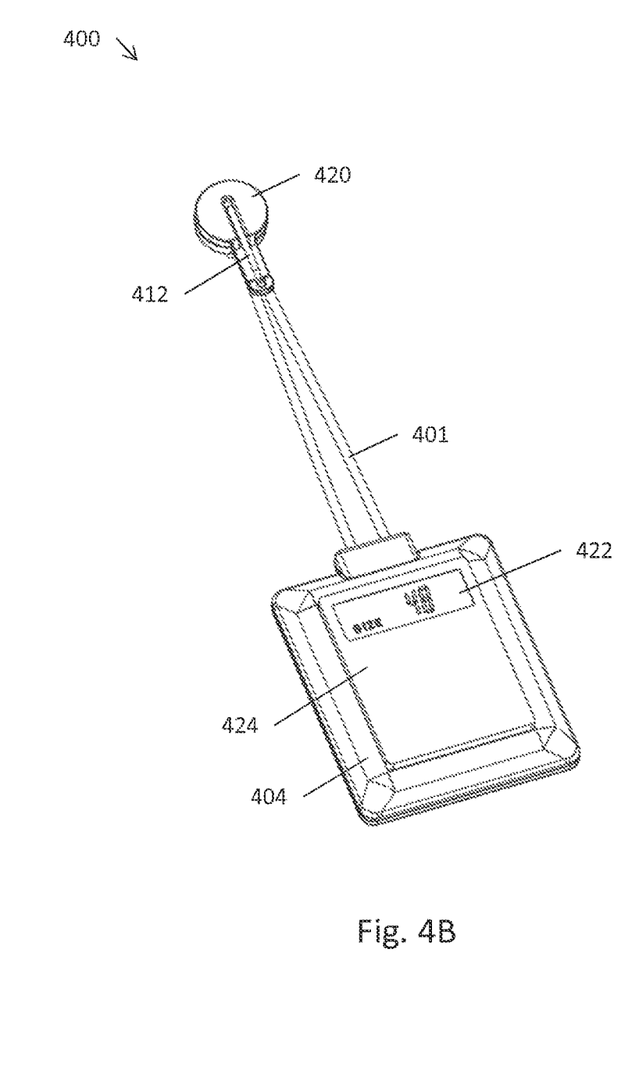
FIG. 4B shows an electronic price label according to one embodiment of the invention and seen diagonally from behind.

In one embodiment of the invention, the second display can be attached, e.g. glued, as a separate component, e.g. as a separate display unit, to the surface of a conventional electronic price label. FIGS. 4A-4B show an example of such an embodiment. The figures in question show an electronic price label according to one embodiment of the invention and seen diagonally from the front and diagonally from behind. In the solution of FIGS. 4A-4B, the second display 422 and e.g. the electronics required by the second display, which electronics are needed for facilitating communication and controlling the display, are arranged inside the display part 424. The display part 424 can be attached to the rear of the electronic price label, to the surface of the frame part 404 of the electronic price label. In a corresponding manner, the display part can also be attached to the front of the electronic price label.

As with the embodiment shown in FIGS. 1A-1B, the price label of FIGS. 4A—4B comprises a fastening tab 401 attached to the frame part and a casing 420 of the fastening part, which is arranged in connection with the fastening tab 401. The fastening part 412 can be arranged to be bending as in the case of the embodiments described above. In one embodiment of the invention, the casing 420 can have a recess for the turned fastening part 412.

In one embodiment of the invention, the second display can be adapted to be updated by means of a near field. Thus, an RFID chip can be arranged in connection with the second display, whereby the second display can be updated by means of an RFID near field. The second display can show e.g. product size information. Communication functioning by means of a near field can be communication, where a signal is transmitted for example at a distance of less than 5 cm from the electronic price label.

In one embodiment of the invention, the electronics required by the second display, the antenna and/or control and communication means, are arranged at least partly inside the frame part of the electronic price label and/or inside the casing of the fastening part. In one embodiment of the invention, the electronics required by the second display, the antenna and/or control and communication means, are arranged at least partly outside the frame part of the electronic price label, e.g. in connection with the surface of the frame part and/or in connection with the casing of the fastening part. In one embodiment of the invention, part of the electronics required by the second display, the antenna and/or control and communication means, are arranged inside the frame part of the electronic price label, and part outside the frame part of the electronic price label.

In the solution of the invention, the part comprising the second display, such as the separate display unit, does not need to be connected electronically to the rest of the electronic price label, but it can function independently and separately from the rest of the electronic price label.

In one embodiment of the invention, the antenna used for transferring information of the second display to the electronics controlling the second display is arranged in connection with the second display and/or in its vicinity. In one embodiment of the invention, the antenna in question is arranged essentially in the same structure and/or module with the second display.

In one embodiment of the invention, the antenna used for transferring information of the second display to the electronics controlling the second display is adapted to function in a near and/or remote field.

In one embodiment of the invention, the information of the second display of the electronic price label is set and/or updated at the same time as the electronic price label is connected to a certain product. If the second display for example shows size information related to the product, this does not need to be set more than once during the selling of the product. When the product is sold and the price label is removed from the product and taken into use again, the information of the second display, such as size information, can then be updated again according to the new product, to which the electronic price label is attached. Also if the product is returned to the store, an electronic price label can be attached to the product and the necessary information can be updated on the first display and second display of the price label.

In one embodiment of the invention, the first display is adapted to be updated via a radio frequency price label system and the first display shows for example price information of the product, which can be updated and changed during the selling of the product.

In one embodiment of the invention, the first display gets its required energy from a voltage source of the electronic price label, such as a battery, and/or the second display gets its required energy with the aid of a near field. In this case the voltage source of the electronic price label does not need to be connected to the second display. Thus, information of the first display can be updated via the electronic price label system and the information of the second display can be updated with the aid of a device brought close to the display.

In one embodiment of the invention, an RFID identifier or chip has been connected in connection with the second display and this can be used, in addition to for transferring information to be displayed on the second display, for identification and location of the electronic price label by the electronic price label system, e.g. during inventory and/or for pairing between a certain electronic price label and a certain product in the product database.

In one embodiment of the invention, the antenna of the electronic price label can be arranged inside the electronic price label, for example inside the frame part. The antenna can for example be a loop antenna, which can be arranged in the structure of the frame part and/or on the inner surface of the frame part.

In one embodiment of the invention, the electronic price label comprises at least two different antennas. One antenna can be arranged in the fastening tab, e.g. in accordance with the above-described examples, and one antenna can be arranged inside the electronic price label, for example as an antenna inside the frame part.

In one embodiment of the invention, the antenna arranged in the frame part can function as an RFID antenna and the antenna formed in the fastening tab can function as an antenna for the electronic price label system. The information to be shown on the first display can in one embodiment of the invention be transferred with the aid of the antenna formed in the fastening tab and the information to be shown on the second display with the aid of the RFID antenna arranged inside the frame part. In one embodiment of the invention, the antenna of the electronic price label system can operate in a near field and/or remote field. In one embodiment of the invention, the RFID antenna can operate in a near field and/or remote field.

In one embodiment of the invention, the electronic price label comprises a battery, which can be placed apart from the frame part of the electronic price label.

In one embodiment of the invention, the fastening tab can function as an antenna for the electronic price label and form a loop, which substantially surrounds the battery and/or protective casing arranged inside and in the middle of the loop. The loop can be formed for example with the aid of the space formed in the protective casing for the fastening tab. The space for the fastening tab can for example circle in connection with the outer edge of the protective casing substantially around the protective casing. If the fastening tab functions as the antenna, the battery conductors can be arranged as conductors separate from the fastening tab functioning as an antenna. The battery conductors can be arranged to run in connection with each other, e.g. in one cable. In one embodiment of the invention, a fastening part, such as a spike, can be arranged in connection with the battery and/or protective casing, whereby the electronic price label can be attached to a product, when the fastening part is pushed through the product or an opening in the product into a separate locking part.

In one embodiment of the invention, the fastening part to be arranged in connection with the battery and/or protective casing, such as the spike, with which the electronic price label can be attached to the product, can be arranged to be turning. The turning fastening part can be turned substantially against the protective casing, whereby it makes it easier to e.g. store the electronic price label when the price label is not in use. The turning fastening part can in connection with attaching to the product be turned substantially perpendicular to the protective casing of the electronic price label, whereby it can be attached through the product into a separate locking part. In one embodiment of the invention, the protective casing can have a recess for the turned fastening part.

In one embodiment of the invention, the solution of the invention can instead of a conventional locking part also use a locking part comprising an anti-theft alarm part.

In one embodiment of the invention, the fastening arrangement functioning as an antenna comprises one ribbon-like fastening tab, which is arranged permanently in connection with the frame part. The fastening tab can also be arranged in connection with the frame part so that it can be easily detached and reattached, for example without tools. The fastening tab can be arranged to circle the electronic price label in connection with the edge of the frame part of the electronic price label. The fastening tab can be electrically connected to the electronic price label and its communication means at least by one point.

In one embodiment of the invention, the fastening tab comprises two separate parts functioning as antenna radiation parts, which can be arranged in connection with the frame part. The radiation parts can be connected electrically to the communication means of the electronic price label via contact points.

In one embodiment of the invention, there can be electrically non-conductive material on the surface of the fastening tab, for example plastic, whereby the fastening tab or fastening tabs functioning as an antenna are electrically separated from each other also when they are in contact with each other.

An antenna comprising two separate radiation parts can function so that both antennas transmit or receive the same transmission as each other, i.e. for example information relating to the electronic price label system and/or a transmission according to the RFID standard. It is also possible to arrange the antennas and the electronic price label so that one antenna transmits and receives information of the electronic price label system (i.e. is the antenna of the electronic price label system) and the other antenna is the RFID antenna.

In one embodiment of the invention, the fastening tab functioning as an antenna is the antenna of the electronic price label system and the electronic price label further comprises a separate RFID antenna, which is arranged in connection with the frame part and/or inside the frame part of the electronic price label.

In one embodiment of the invention, the antenna of the electronic price label system is used for communicating information related to the first display and the RFID antenna is used for communicating information related to the second display. The information can according to one embodiment of the invention be transmitted in a near field and/or remote field.

In one embodiment of the invention, the electronic price label comprises anti-theft properties. In one embodiment of the invention, a separate RFID tag, which can be used as an anti-theft alarm, can also be integrated into the electronic price label. In one embodiment of the invention, the RFID tag or chip, which is used for transferring information of the second display, can also be used as an RFID tag to be used as an anti-theft alarm.

The invention also relates to an electronic price label system, which comprises several electronic price labels and at least one base station, which is adapted for transmitting and receiving information with any electronic price label.

In one embodiment of the invention, the system comprises an optical scanner, which is adapted to scan e.g. bar codes, and where the system is adapted to transmit information to be updated to the second display, such as product size information, based on the scanning event of the electronic price label and/or an optically scanned code.

In one embodiment of the invention, the system comprises a device, e.g. an RFID reader, which is adapted to transmit information to be displayed on the second display to the electronic price label with the aid of a near field, e.g. with the aid of RFID technology.

In one embodiment of the invention, the electronic price label system is adapted to identify an electronic price label and/or to locate an electronic price label with the aid of an RFID identifier and/or RFID chip of the second display connected thereto.

In one embodiment of the invention, at the same time as information of the product, such as product price and other information, is read from the system, e.g. with the aid of an EAN code, the product size information is simultaneously received, which size information is transferred to the electronic price label and/or to the second display of the electronic price label along another communication channel than the price information.

In one embodiment of the invention, when information related to the second display, e.g. size information, is transferred to the second display, to the display unit comprising the second display or to the electronic price label, product information can also be stored and/or written in a memory connected in connection with the second display or the display unit comprising the second display, such as in an RFID tag. The product information can be any information related to identification of the product, such as an EAN code, brand information, model information and/or size information.

In one embodiment of the invention, the electronic price label system is adapted to give an alarm signal. The system can for example give an alarm signal in a situation, where the base station cannot communicate with the electronic price label and/or if the fastening tab of the electronic price label has been cut.

In one embodiment of the invention, the electronic price label system can further comprise security gates and the alarm signal can be based on a response from the security gates, when an electronic price label is brought through the security gate.

The RFID tag or RFID chip described in the solution and exemplary embodiments of the invention can be replaced in the examples shown in the application with a wirelessly remotely readable tag or identifier. Thus, the above-described embodiments, which utilize RFID technology and an RFID tag, can be implemented also with another wireless remotely readable identifier and technology corresponding to this identifier.

It is obvious for a person skilled in the art that the invention is not restricted to the embodiments presented above, but it can be modified within the scope of the appended claims. The characteristics shown in the description, which are mentioned together, can also be independent characteristics.

The invention claimed is:

1. An electronic price label comprising:
   communication means for receiving information related to a product;
   a first display for displaying information related to the product; and
   a second display for displaying information related to the product,
   where the first display and the second display are separate displays, and
   wherein the first display and second display are adapted to be controlled separate from each other, and
   wherein the first display of the electronic price label is configured to be communicated for receiving information for updating the information displayed in the first display by means of a different system and/or technology from those by means of which the second display of the electronic price label is configured to be communicated for receiving information for updating the information displayed in the second display.

2. The electronic price label according to claim 1, wherein the second display, a display unit comprising the second display and/or the electronic price label comprises means, with the aid of which the second display is adapted to be updated with the aid of a near field.

3. The electronic price label according to claim 1, wherein an RFID chip has been arranged in connection to the second display, with the aid of which chip the second display is adapted to be updated with the aid of an RFID near field.

4. The electronic price label according to claim 1, wherein the electronic price label comprises means, with the aid of which the first display is adapted to be updated via a base station of a radio frequency price label system and/or electronic price label system.

5. The electronic price label according to claim 1, wherein the first display and second display are adapted to show different information related to the product.

6. The electronic price label according to claim 1, wherein the first display is connected to a voltage source of the electronic price label, whereby the first display is adapted to receive its required energy from the voltage source of the electronic price label, and/or the second display comprises means for receiving energy wirelessly, whereby the second display is adapted to receive its required energy wirelessly.

7. The electronic price label according to claim 6, wherein the second display has not been connected to the voltage source of the electronic price label.

8. The electronic price label according to claim 1, wherein the first display is arranged on the first side of the electronic price label and the second display is arranged on the second side of the electronic price label.

9. The electronic price label according to claim 1, wherein the first display and the second display are arranged on one and the same side of the electronic price label.

10. The electronic price label according to claim 1, wherein the second display or the display unit comprising the second display is arranged outside the frame part of the electronic price label.

11. The electronic price label according to claim 10, wherein the second display or the display unit comprising the second display is arranged on a surface of the frame part of the electronic price label with a glue or tape.

12. The electronic price label according to claim 1, wherein the first display and/or the second display or the display unit comprising the second display is arranged in connection with the frame part of the electronic price label.

13. The electronic price label according to claim 12, wherein the first display and/or the second display or the display unit comprising the second display is arranged substantially inside the frame part of the electronic price label.

14. The electronic price label according to claim 1, wherein the first display and/or the second display is a display based on electronic ink.

15. An electronic price label system, comprising:
    electronic price labels each comprising:
       communication means for receiving information related to a product;
       a first display for displaying information related to the product; and
       a second display for displaying information related to the product,
       where the first display and the second display are separate displays, and
       wherein the first display and second display are adapted to be controlled separate from each other, and
       wherein the first display of the electronic price label is configured to be communicated for receiving information for updating the information displayed in the first display by means of a different system and/or technology from those by means of which the second display of the electronic price label is configured to be communicated for receiving information for updating the information displayed in the second display; and
    at least one base station, which is adapted for transmitting and receiving information with any electronic price label.

16. The system according to claim 15, wherein the system comprises an optical scanner, which is adapted to scan bar codes, and where the system is adapted to transmit information to be updated to the second display based on the scanning event of the electronic price label and/or an optically scanned code.

17. The system according to claim 15, wherein the system comprises a device adapted to transmit information to be displayed on the second display to the second display, to a display unit comprising the second display and/or to the electronic price label with the aid of a near field.

18. The system according to claim 15, wherein the electronic price label system is adapted to identify an electronic price label and/or to locate an electronic price label with the aid of an RFID identifier and/or RFID chip of the second display connected thereto.

19. The system according to claim 15, wherein the electronic price label system is adapted to transmit product information to the second display, to the display unit comprising the second display and/or to the electronic price label, which product information is adapted to be stored in a memory connected in connection with the second display or the display unit comprising the second display, where the product information is information related to identification of the product.

20. The system according to claim 19, wherein the electronic price label system is adapted to transmit product information to the electronic price label substantially at the same time as information related to the second display, different from the product information, is transferred to the second display, to the display unit comprising the second display or to the electronic price label.

* * * * *